Feb. 13, 1934.    J. L. MATTHEWS    1,946,750
GEAR SHIFT CONTROL MECHANISM
Filed May 26, 1933
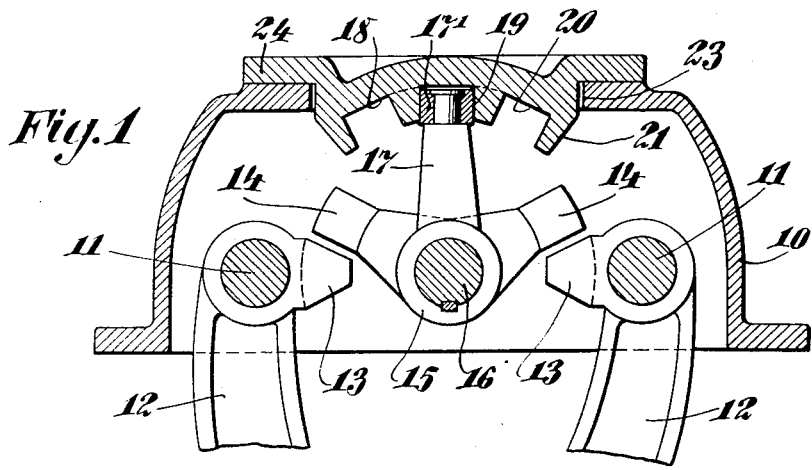
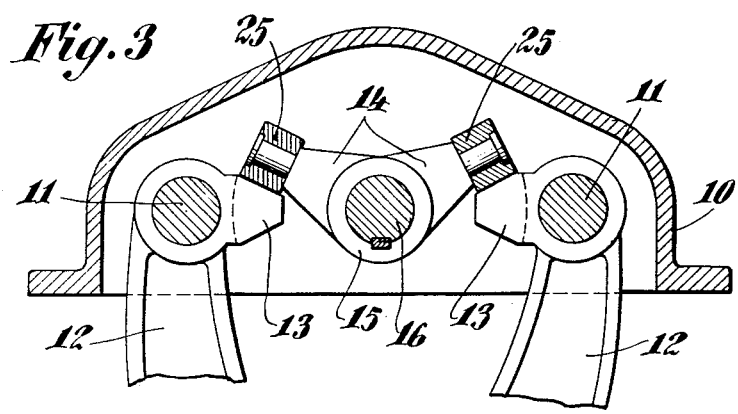
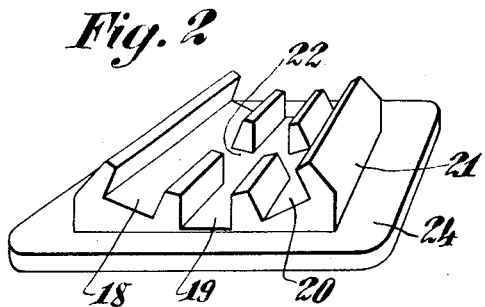
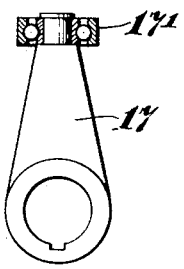
INVENTOR
Joseph L. Matthews,
BY Redding, Greeley, O'Shea & Campbell
HIS ATTORNEYS Patented Feb. 13, 1934

1,946,750

UNITED STATES PATENT OFFICE 1,946,750

GEAR SHIFT CONTROL MECHANISM

Joseph L. Matthews, Highland Park, N. J., assignor to International Motor Company, New York, N. Y., a corporation of Delaware Application May 26, 1933. Serial No. 673,002

1 Claim. (Cl. 74—39)

The present invention relates to control mechanism for gear shifting apparatus and embodies, more specifically, an improved mechanism by means of which the shifter forks of a gear shifting mechanism may be effectively controlled.

Where stops for a transmission mechanism are self-contained in the mechanism itself, considerable friction results by reason of the rubbing of the shifter fingers against the selector shaft hubs. This eventually gives rise to hard shifting and unsatisfactory operation. In order that a self-contained stop mechanism may be utilized satisfactorily, the present invention has been designed and an object thereof is to provide a shifting mechanism for transmissions wherein injurious rubbing between relatively movable parts is effectively eliminated.

A further object of the invention is to provide a control mechanism for transmission shifting devices wherein movement of the selecting and controlling elements takes place under control of relatively moving surfaces between which anti-friction bearings are provided.

Further objects, not specifically enumerated above, will be apparent as the invention is described in greater detail in connection with the accompanying drawing, wherein:

Figure 1 is a view in transverse section taken through the control and shifting mechanism of a transmission constructed in accordance with the present invention.

Figure 2 is a view in isometric projection showing the construction of a guide track constructed in accordance with the present invention.

Figure 3 is a view similar to Figure 1, showing a modified form of the invention.

Figure 4 is a detail view showing a modified form of anti-friction bearing utilized in connection with either of the constructions shown in Figures 1 and 3.

Referring to the above drawing a transmission control housing is shown at 10 and is adapted to be secured to a transmission housing in accordance with common practice. Within housing 10, shifter shafts 11 are secured upon which shifter forks 12 are adapted to slide. Shifter forks 12 are formed with spaced fingers 13 between which shifter fingers 14 are adapted to be moved to effect sliding movement of the shifter forks upon the shafts 11. Shifter fingers 14 are mounted upon a sleeve 15 which is secured to a selector shaft 16 and actuated in a well known manner.

Secured to the sleeve 15 is a selector arm 17 which has a roller 17' journaled upon the end thereof. The roller 17' is adapted to engage tracks 18, 19, and 20 formed in a selector controlling track member 21. A cross track 22 is provided to permit proper motion of the gear shift lever in neutral position and the member 21 is adapted to be placed over an aperture 23 formed in the housing 10. A plate 24 is formed about the member 21 and is adapted to be suitably secured to the housing 10.

It will be seen that fingers 14 are spaced from the adjacent portions of the shifter forks and thus frictional contact therebetween is prevented. Movement of the fingers 14 is controlled by the selector arm 17 which, in combination with the track member 21 permits the fingers 14 to engage the fingers 13 only when a desired shifting operation is to be effected. In as much as there is no sliding contact between selector arms 17 and the tracks of the track member 21, the frictional resistance to selecting and shifting operations is reduced to a minimum.

In the form of the invention shown in Figure 3, the shifter fingers are provided with rollers 25 which are adapted to engage the cooperating surfaces of the respective forks 12 and thus provide rolling contact between such surfaces, rather than a sliding or rubbing contact.

Figure 4 illustrates a form of bearing for the selector arm or shifter fingers in which the roller is mounted upon the supporting arm or finger with ball bearings.

From the foregoing, it will be seen that the selecting and shifting operations have been greatly facilitated by the elimination of sliding and rubbing contact between wearing surfaces and the resulting control mechanism thus is far more serviceable than in mechanisms now available.

While the invention has been described with specific reference to the accompanying drawing, it is not to be limited, save as defined in the appended claim.

I claim as my invention:

A control device for gear shifting mechanism having a plurality of shifter forks and shifter fingers adapted to engage the forks including a selector arm movable with the shifter fingers, a roller on the arm, and a member having tracks formed therein to receive and guide the movement of the roller on the arm, the tracks in the last named member and the fingers and arm being formed to maintain the fingers out of engagement with the respective shifter forks except during the time that an operated fork is in its operative position.

JOSEPH L. MATTHEWS.